US012695253B2

(12) United States Patent
Kojima et al.

(10) Patent No.: US 12,695,253 B2
(45) Date of Patent: Jul. 28, 2026

(54) SHIELDED ELECTRICALLY CONDUCTIVE PATH

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Yusuke Kojima, Osaka (JP); Kazuaki Hamada, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 397 days.

(21) Appl. No.: 18/576,099

(22) PCT Filed: Jul. 4, 2022

(86) PCT No.: PCT/JP2022/026570
§ 371 (c)(1),
(2) Date: Jan. 2, 2024

(87) PCT Pub. No.: WO2023/282225
PCT Pub. Date: Jan. 12, 2023

(65) Prior Publication Data

US 2024/0313483 A1 Sep. 19, 2024

(30) Foreign Application Priority Data

Jul. 7, 2021 (JP) ................................ 2021-112602

(51) Int. Cl.

| | |
|---|---|
| ***H01R 13/6592*** | (2011.01) |
| ***H01R 4/18*** | (2006.01) |
| ***H01R 9/03*** | (2006.01) |

(52) U.S. Cl.
CPC ......... *H01R 13/6592* (2013.01); *H01R 4/183* (2013.01)

(58) Field of Classification Search
CPC .......... H01R 13/5808; H01R 13/65915; H01R 13/6592; H01R 4/183; H01R 4/184; H01R 43/16; H01R 9/03
See application file for complete search history.

(56) References Cited

U.S. PATENT DOCUMENTS 3,670,293 A * 6/1972 Garver ................ H01R 9/0518 439/585
5,246,384 A * 9/1993 Sato .................... H01R 9/0518 439/585

(Continued)

FOREIGN PATENT DOCUMENTS

JP 2010-182647 A 8/2010
JP 2020-057493 A 4/2020

(Continued)

OTHER PUBLICATIONS

International Search Report issued on Sep. 20, 2022 for WO 2023/282225 A1 (4 pages).

*Primary Examiner* — Abdullah A Riyami
*Assistant Examiner* — Thang H Nguyen
(74) *Attorney, Agent, or Firm* — Venjuris, P.C.

(57) ABSTRACT

A shielded electrically conductive path is provided with a shielded cable including a core wire, a braided wire, a sheath and a folded portion covering an outer surface of the sheath and formed by folding a front end part of the braided wire rearward, a sleeve swaged to the outer surface of the sheath between the outer surface of the sheath and the folded (Continued)

portion, and a second outer conductor formed with a rear crimping portion in a rear end part. The rear crimping portion includes a swaging portion and claw portions cantilevered radially inward from a rear end of the swaging portion. The sleeve includes a tubular base portion and an extending portion extending rearward from a rear end edge of the base portion. An outer diameter of a rear end of the extending portion is larger than that of the base portion.

2 Claims, 14 Drawing Sheets

(56) References Cited

U.S. PATENT DOCUMENTS

| | | | | |
|---|---|---|---|---|
| 6,059,607 | A * | 5/2000 | Wilson | H01R 13/648<br>439/607.47 |
| 7,422,480 | B1 * | 9/2008 | Musick | H01R 9/0518<br>439/879 |
| 9,960,504 | B2 * | 5/2018 | Hikosaka | H01R 4/18 |
| 10,741,975 | B2 * | 8/2020 | Jones | H01R 13/6583 |
| 11,749,953 | B2 * | 9/2023 | Murata | H01R 13/6582<br>439/607.41 |
| 12,362,524 | B2 * | 7/2025 | Ito | H01R 9/0518 |
| 2017/0201034 | A1 * | 7/2017 | Hikosaka | H01R 13/6473 |
| 2019/0199013 | A1 * | 6/2019 | Kanemura | H01R 4/185 |
| 2019/0199014 | A1 * | 6/2019 | Kanemura | H01R 13/113 |
| 2020/0014129 | A1 * | 1/2020 | Hamada | H01R 4/2495 |
| 2022/0077635 | A1 * | 3/2022 | Maesoba | H01R 13/6582 |
| 2022/0255270 | A1 * | 8/2022 | Maesoba | H01R 43/048 |
| 2023/0198171 | A1 * | 6/2023 | Hamada | H01R 13/6593<br>439/607.41 |

FOREIGN PATENT DOCUMENTS

| | | | | |
|---|---|---|---|---|
| WO | WO-2018142886 | A1 * | 8/2018 | H01R 13/6593 |
| WO | WO-2021029201 | A1 * | 2/2021 | H01R 4/184 |

* cited by examiner

SHIELDED ELECTRICALLY CONDUCTIVE PATH

CROSS REFERENCE TO RELATED APPLICATIONS

This application is a national phase of PCT application No. PCT/JP2022/026570, filed on 4 Jul. 2022, which claims priority from Japanese patent application No. 2021-112602, filed on 7 Jul. 2021, all of which are incorporated herein by reference.

TECHNICAL FIELD

The present disclosure relates to a shielded electrically conductive path.

BACKGROUND

Patent Document 1 discloses a terminal-equipped shielded cable including a shielded cable and a terminal. The shielded cable includes a braided wire surrounding a wire and a sheath surrounding the braided wire, and a folded portion covering the outer peripheral surface of the sheath is formed by folding a front end part of the braided wire rearward. A barrel is formed in a rear end part of the terminal, and a protrusion projecting radially inward is formed at the rear end of the barrel. A sleeve is arranged in a gap between the outer peripheral surface of the sheath and the folded portion, and swaged to the outer peripheral surface of the sheath. The barrel is swaged to the sleeve while surrounding the folded portion. The protrusion is arranged to face the sleeve from behind. If a rearward tensile force is applied to the shielded cable, the sleeve integrated with the shielded cable is locked to the protrusion, whereby the shielded cable and the terminal are held in a fixed state.

PRIOR ART DOCUMENT

Patent Document

Patent Document 1: JP 2018-147564 A

SUMMARY OF THE INVENTION

Problems to be Solved

Since the folded portion of the braided wire is interposed between the inner peripheral surface of the barrel and the outer peripheral surface of the sleeve, the sleeve pushes the protrusion at a position more radially inward than a bent portion continuous with the protrusion and the barrel when a tensile load is applied to the shielded cable. A moment of a force originated from the bent portion continuous with the protrusion and the barrel when the sleeve pushes the sleeve increases toward the projecting end of the protrusion. Thus, in the terminal-equipped shielded cable of Patent Document 1, when a tensile load is applied to the shielded cable, there is a concern that the protrusion pushed by the sleeve is deformed to open and the reliability of a fixing function by the locking of the sleeve and the protrusion is reduced.

A shielded electrically conductive path of the present disclosure was completed on the basis of the above situation and aims to improve the reliability of a fixing function against a tensile load.

Means to Solve the Problem

The present disclosure is directed to a shielded electrically conductive path with a shielded cable including a shield layer surrounding a conductor, a sheath surrounding the shield layer and a folded portion covering an outer peripheral surface of the sheath, the folded portion being formed by folding a front end part of the shield layer rearward, a sleeve arranged in a gap between the outer peripheral surface of the sheath and the folded portion, the sleeve being swaged to the outer peripheral surface of the sheath, and an outer conductor formed with a crimping portion in a rear end part, the crimping portion including a tubular swaging portion and a claw portion cantilevered radially inward from a rear end of the swaging portion, the sleeve including a base portion and an extending portion extending rearward from a rear end edge of the base portion, an outer diameter of a rear end of the extending portion being larger than that of the base portion, and the crimping portion being crimped to the sleeve in a state where the swaging portion surrounds the folded portion and the claw portion faces the extending portion from behind.

Effect of the Invention

According to the present disclosure, it is possible to improve the reliability of a fixing function against a tensile load.

DETAILED DESCRIPTION TO EXECUTE THE INVENTION

Description of Embodiments of Present Disclosure

Figure 1:
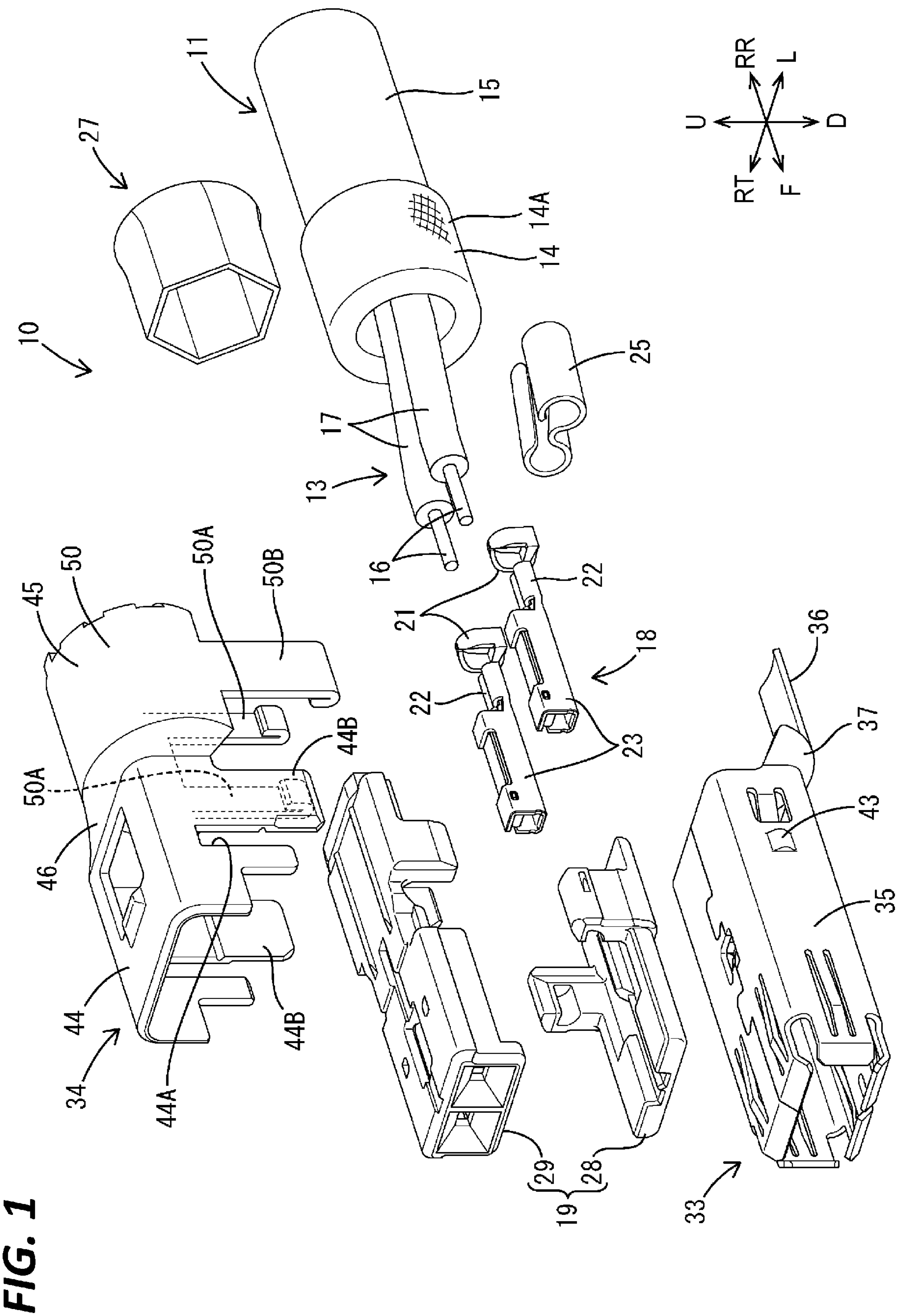
FIG. 1 is an exploded perspective view of a shielded electrically conductive path.

First, embodiments of the present disclosure are listed and described.

(1) The shielded electrically conductive path of the present disclosure is provided with a shielded cable, a sleeve and an outer conductor. The shielded cable includes a shield layer surrounding a conductor, a sheath surrounding the shield layer and a folded portion covering an outer peripheral surface of the sheath, the folded portion being formed by folding a front end part of the shield layer rearward. The sleeve is arranged in a gap between the outer peripheral surface of the sheath and the folded portion, and swaged to the outer peripheral surface of the sheath. The outer conductor is formed with a crimping portion in a rear end part. The crimping portion includes a tubular swaging portion and a claw portion cantilevered radially inward from a rear end of the swaging portion. The sleeve includes a base portion and an extending portion extending rearward from a rear end edge of the base portion. An outer diameter of a rear end of the extending portion is larger than that of the base portion. The crimping portion is crimped to the sleeve in a state where the swaging portion surrounds the folded portion and the claw portion faces the extending portion from behind.

If the shielded cable is pulled rearward, the extending portion pushes the claw portion rearward. A moment of a force originated from a bent portion continuous with the claw portion and the swaging portion is smaller when a base end part of the claw portion is pushed than when a tip part thereof is pushed. Since the extending portion pushes the base end part of the claw portion in the shielded electrically conductive path of the present disclosure, there is no possibility that the claw portion is deformed to open rearward. Therefore, according to the shielded electrically conductive path of the present disclosure, the reliability of a fixing function against a tensile load can be improved.

(2) Preferably, an outer peripheral edge of the rear end of the extending portion is in contact with an inner periphery of the swaging portion. According to this configuration, since a position where the extending portion pushes the claw portion can be set at a position closest to the swaging portion, the reliability of the fixing function against a tensile load can be most enhanced.

(3) Preferably, a part of the folded portion is sandwiched in a squeezed state between an outer peripheral surface of the extending portion and an inner peripheral surface of the swaging portion. According to this configuration, misalignment between the sleeve and the folded portion can be prevented.

(4) Preferably, a rear end outer peripheral edge of the extending portion has a circular shape, and a rear end part of the crimping portion has an elliptical shape. According to this configuration, even if the swaging accuracy of the sleeve and that of the crimping portion are low, parts continuous with a minor axis, out of the swaging portion, can be brought into contact with the outer peripheral edge of the extending portion.

DETAILS OF EMBODIMENT OF PRESENT DISCLOSURE

Embodiment

One specific embodiment of the present disclosure is described with reference to FIGS. 1 to 12. In the following description, left and right sides in FIG. 1 are defined as front and rear sides concerning a front-rear direction. Upper and lower sides in FIG. 1 are directly defined as upper and lower sides concerning a vertical direction. Back and frontal sides in FIG. 1 are defined as right and left sides concerning a lateral direction.

As shown in FIG. 1, a shielded electrically conductive path 10 is provided with a shielded cable 11, a sleeve 27, female terminals 18, a dielectric 19, a first outer conductor 33, and a second outer conductor 34, which is an outer conductor.

[Shielded Cable]

The shielded cable 11 is formed such that the outer peripheries of two coated wires 13 are surrounded by a braided wire 14, which is a shield layer made of metal thin wires, and the outer periphery of the braided wire 14 is surrounded by a sheath 15. The two coated wires 13 are so-called twisted pair wires. Each coated wire 13 includes a core wire 16, which is a conductor, and an insulation coating 17 surrounding the outer periphery of the core wire 16. Copper, copper alloy, aluminum, aluminum alloy or the like is used for the core wire 16. The core wire 16 may be constituted by one metal strand or a stranded wire formed by twisting a plurality of metal strands. The insulation coatings 17 and the sheath 15 are made of insulating and flexible synthetic resin. An end processing such as stripping is applied to an end of the shielded cable 11 to expose an end of each of the core wires 16, the insulation coatings 17 and the braided wire 15. The braided wire 14 is formed by braiding a plurality of metal thin wires into a tubular shape. A part of the braided wire 14 exposed to extend from the end of the sheath 15 is folded toward an end side of the sheath 15 (rearward) and is formed as a folded portion 14A covering the outer peripheral surface of the sheath 15.

[Sleeve]

Figure 2:
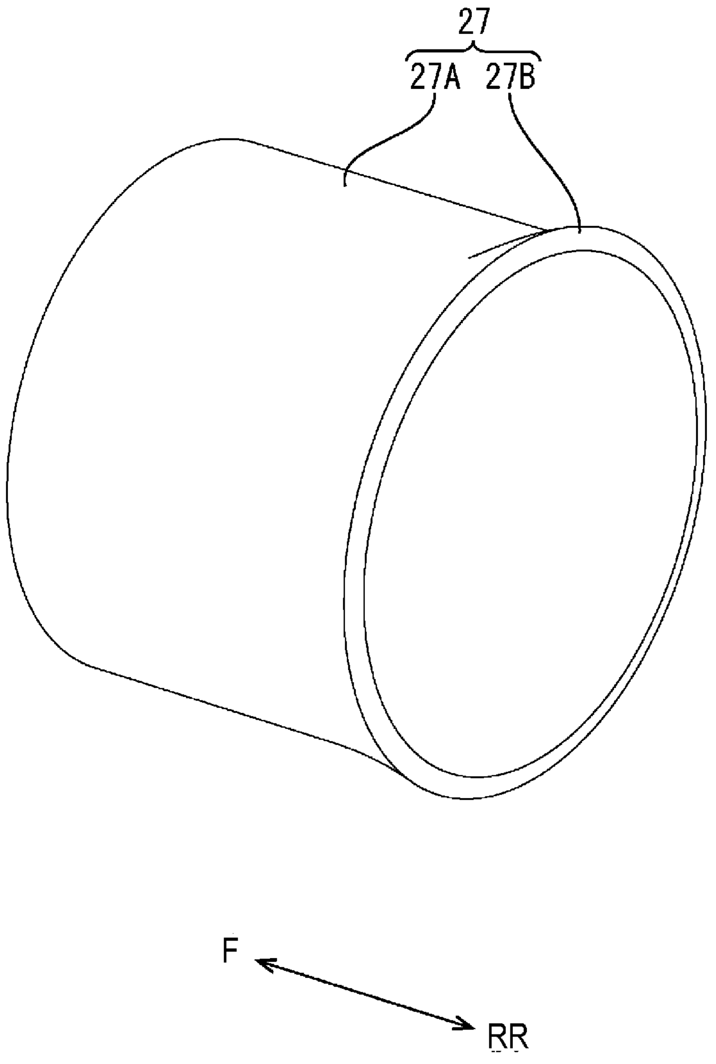
FIG. 2 is a perspective view of a sleeve before being swaged to a sheath.
Figure 3:
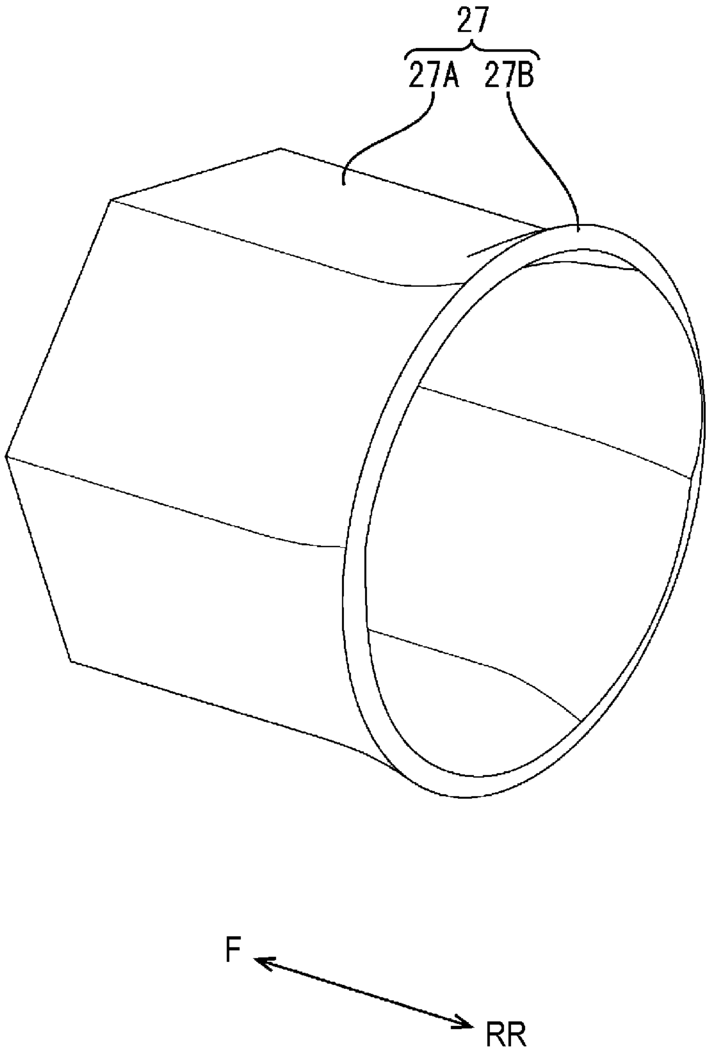
FIG. 3 is a perspective view of the sleeve after being swaged to the sheath.

The sleeve 27 is made of metal. As shown in FIGS. 2 and 3, the sleeve 27 includes a base portion 27A and an extending portion 27B. Before being swaged to the end of the sheath 15, the base portion 27A of the sleeve 27 has a hollow cylindrical shape (see FIG. 2). The extending portion 27B has a tubular shape communicating with the base portion 27A, and extends rearward from the rear end edge of the base portion 27A. The extending portion 27B is expanded in diameter into a conical shape as being more separated rearward from the base portion 27A.

Figure 8:
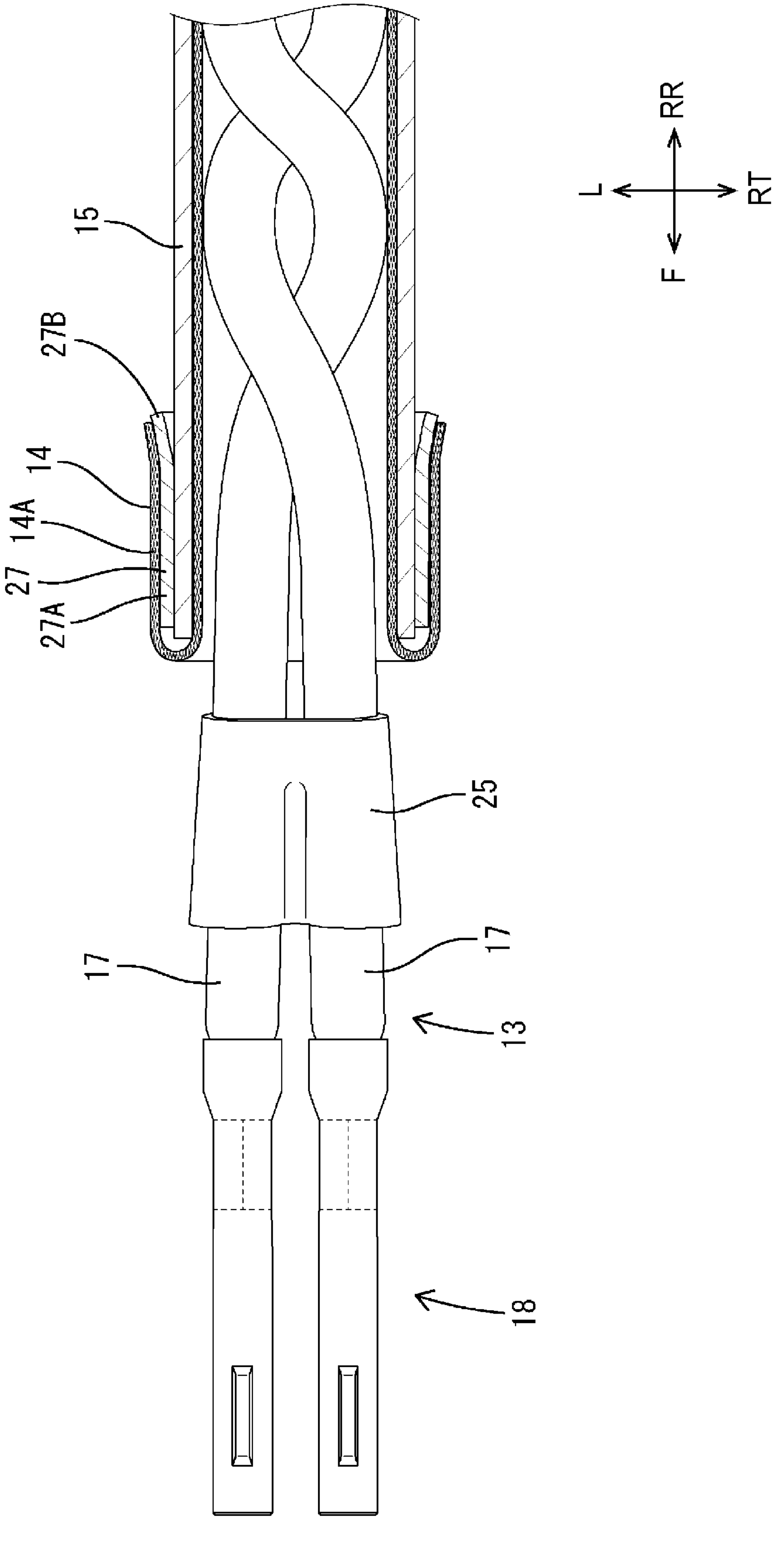
FIG. 8 is a side view in section showing a state where a sleeve is externally fit on and swaged to the end part of the shielded cable and a clip is attached to the end parts of the coated wires.
Figure 9:
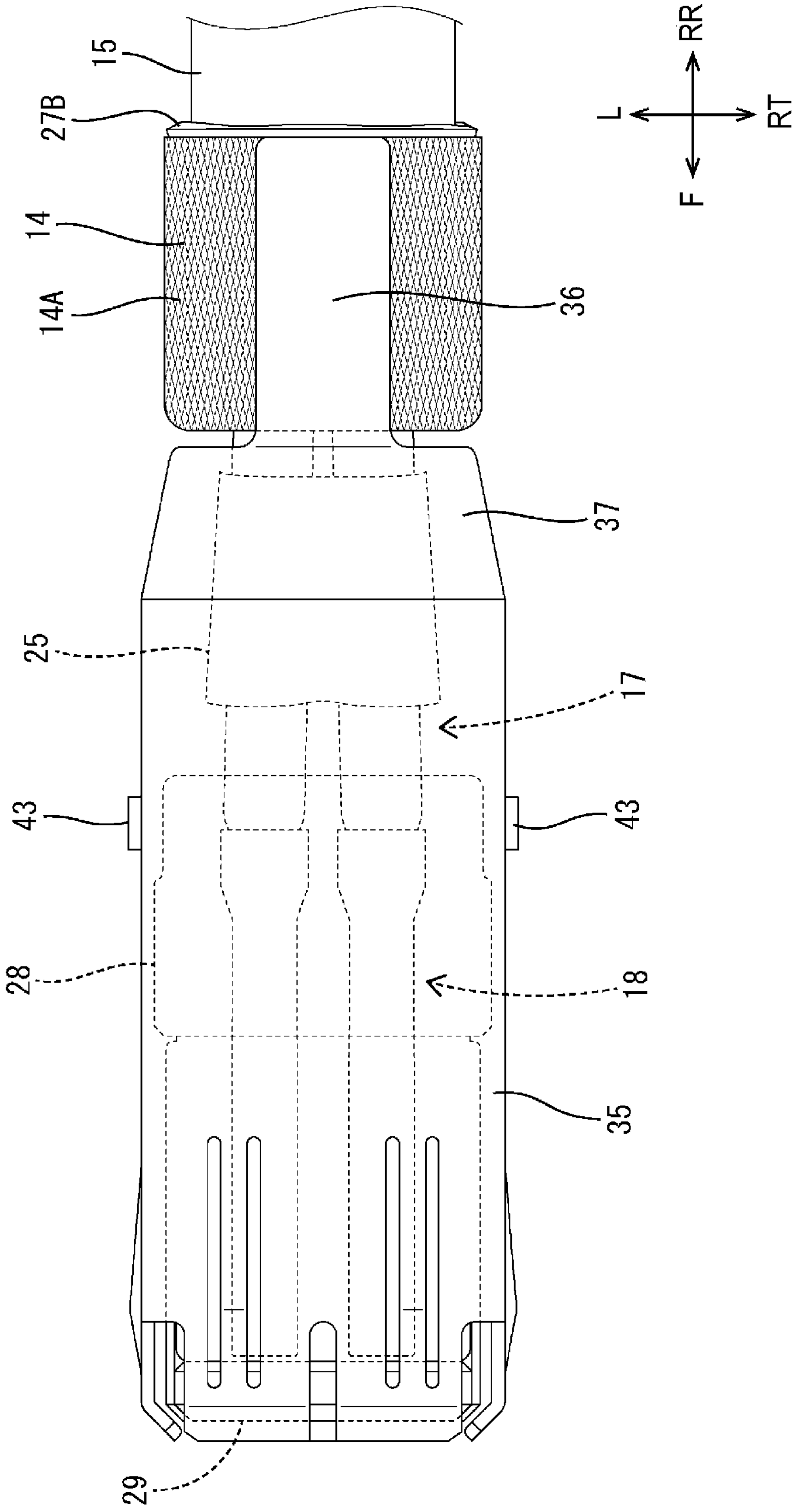
FIG. 9 is a side view showing a state where a dielectric mounted on the female terminals is inserted in a rectangular tube portion of a first outer conductor.

The sleeve 27 is swaged to the outer peripheral surface of the sheath 15 and, thereafter, arranged to cover the outer peripheral surface of the sheath 15 in a gap between the outer peripheral surface of the end of the sheath 15 and the folded portion 14A (braided wire 14) by folding the exposed braided wire 14 (see FIG. 8). The shape of the base portion 27A changes to a hexagonal shape, in which six flat plates are annularly arranged, by being swaged to the end of the sheath 15 (see FIG. 3). After being swaged to the end of the sheath 15, the shape of the extending portion 27B gradually changes from the hexagonal shape to a circular shape while being more separated rearward from the base portion 27A. An outer diameter of the rear end of the extending portion 27B is larger than that of the base portion 27A.

[Female Terminal]

Figure 7:
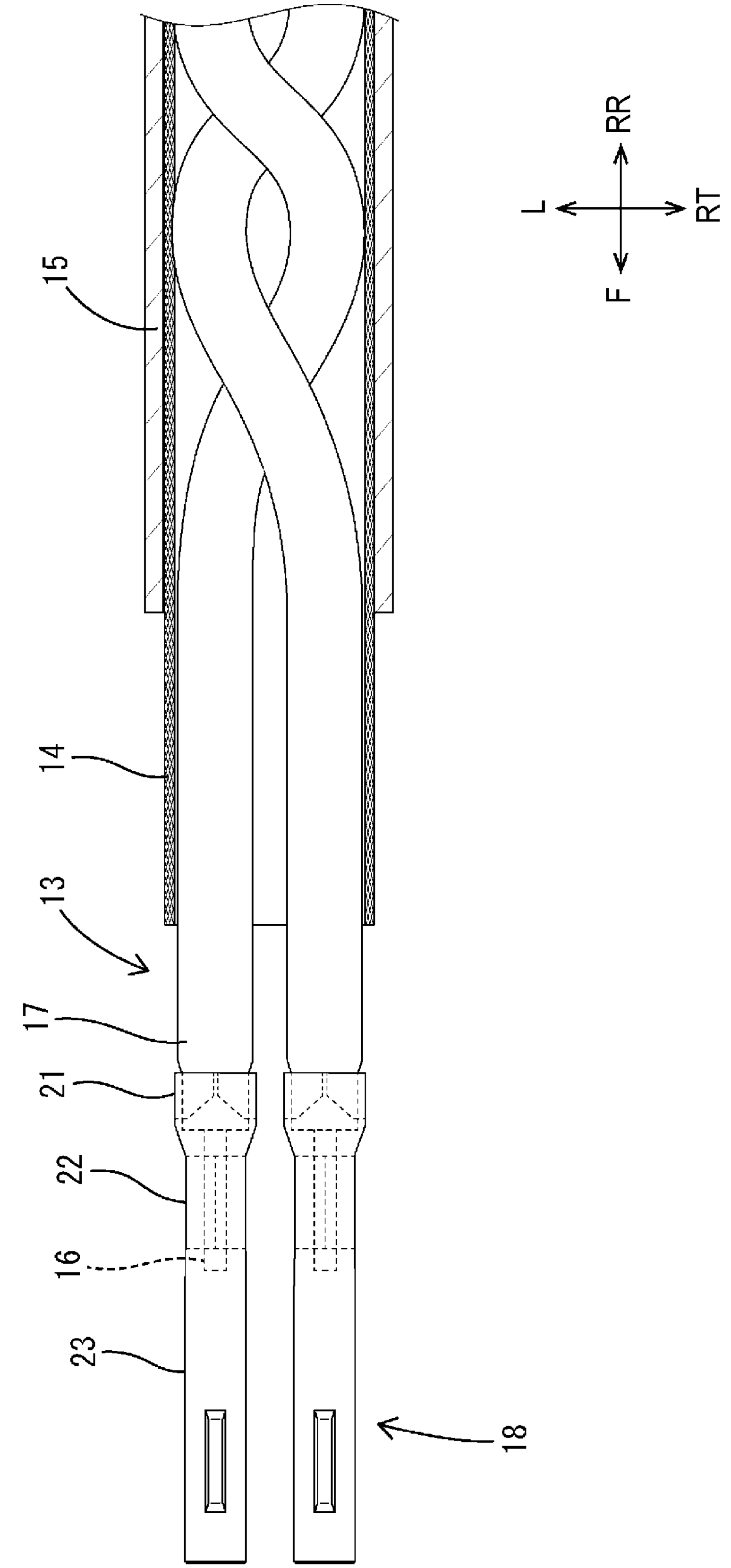
FIG. 7 is a side view in section showing a state where female terminals are mounted on end parts of coated wires.

The female terminal 18 is formed by press-working a metal plate material into a predetermined shape. Copper, copper alloy, aluminum, aluminum alloy or the like is used for the female terminal 18. As shown in FIG. 7, the female terminal 18 is connected to an end of each coated wire 13. The female terminal 18 includes an insulation barrel 21, a wire barrel 22 and a tube portion 23. The insulation barrel 21 is crimped to wind around the outer periphery of the insulation coating 17 of the coated wire 13. The wire barrel 22 is connected in front of the insulation barrel 21 and crimped to wind around the outer periphery of the core wire 16. The tube portion 23 is connected in front of the wire barrel 22, and an unillustrated mating terminal is inserted thereinto. An unillustrated resilient contact piece is arranged in the tube portion 23. By inserting the mating terminal into the tube portion 23 from front, the mating terminal and the resilient contact piece resiliently contact and the mating terminal and the female terminal 18 are electrically connected.

[Clip]

One clip 25 is attached to the two coated wires 13 drawn out from the end of the sheath 15. The clip 25 is formed by press-working a metal plate material into a predetermined shape. As shown in FIG. 1, the clip 25 is substantially W-shaped when viewed from the front-rear direction. The clip 25 is crimped to wind around the outer peripheries of the insulation coatings 17 of the respective coated wires 13 (see FIG. 8). By crimping the clip 25 to the two coated wires 13, the two coated wires 13 are held in relative positions.

[Dielectric]

As shown in FIG. 1, the dielectric 19 includes a lower dielectric 28 open upward and arranged on a lower side and an upper dielectric 29 to be assembled with the lower dielectric 28 from above. The lower and upper dielectrics 28, 29 are made of insulating synthetic resin. With the lower and upper dielectrics 28, 29 assembled, cavities for accommodating the female terminals 18 are formed to extend in the front-rear direction in the dielectric 19. In this embodiment, two cavities are formed side by side in the lateral direction.

[First Outer Conductor]

The first outer conductor 33 is formed by press-working a metal plate material into a predetermined shape. Copper, copper alloy, aluminum, aluminum alloy or the like is used for the first outer conductor 33. As shown in FIG. 1, the first outer conductor 33 includes a rectangular tube portion 35, a connecting plate portion 36 and a first coupling portion 37. The rectangular tube portion 35 is in the form of a rectangular tube extending in the front-rear direction. The connecting plate portion 36 is provided behind the rectangular tube portion 35, in the form of a plate elongated in the front-rear direction and overlapped on the folded portion 14A from below. The first coupling portion 37 couples the rectangular tube portion 35 and the connecting plate portion 36 in the front-rear direction. The inner shape of the rectangular tube portion 35 is the same as or somewhat larger than the outer shape of the dielectric 19. The dielectric 19 is inserted into the rectangular tube portion 35 from behind. A projecting portion 43 projecting laterally outward by being struck is formed in a rear part of each of left and right walls of the rectangular tube portion 35 (see FIG. 9).

As shown in FIG. 1, the first coupling portion 37 extends obliquely downward toward a rear side from a lower side of the rear end edge of the rectangular tube portion 35. The connecting plate portion 36 extends rearward from a laterally central part of the rear end edge of the first coupling portion 37. The connecting plate portion 36 is in the form of a plate elongated in the front-rear direction. A laterally central part of the connecting plate portion 36 is curved to bulge downward from a front end to a rear end.

[Second Outer Conductor]

The second outer conductor 34 is formed by press-working a metal plate material into a predetermined shape. Copper, copper alloy, aluminum, aluminum alloy or the like is used for the second outer conductor 34. The second outer conductor 34 includes a front crimping portion 44, a rear crimping portion 45, which is a crimping portion, and a second coupling portion 46. The front crimping portion 44 is located on a front side and crimped to the outer periphery of the rectangular tube portion 35 (see FIG. 10). The rear crimping portion 45 is located on a rear side and crimped to the folded portion 14A and the connecting plate portion 36 overlaid on the folded portion 14A (see FIG. 11). The second coupling portion 46 couples the front crimping portion 44 and the rear crimping portion 45.

Figure 4:
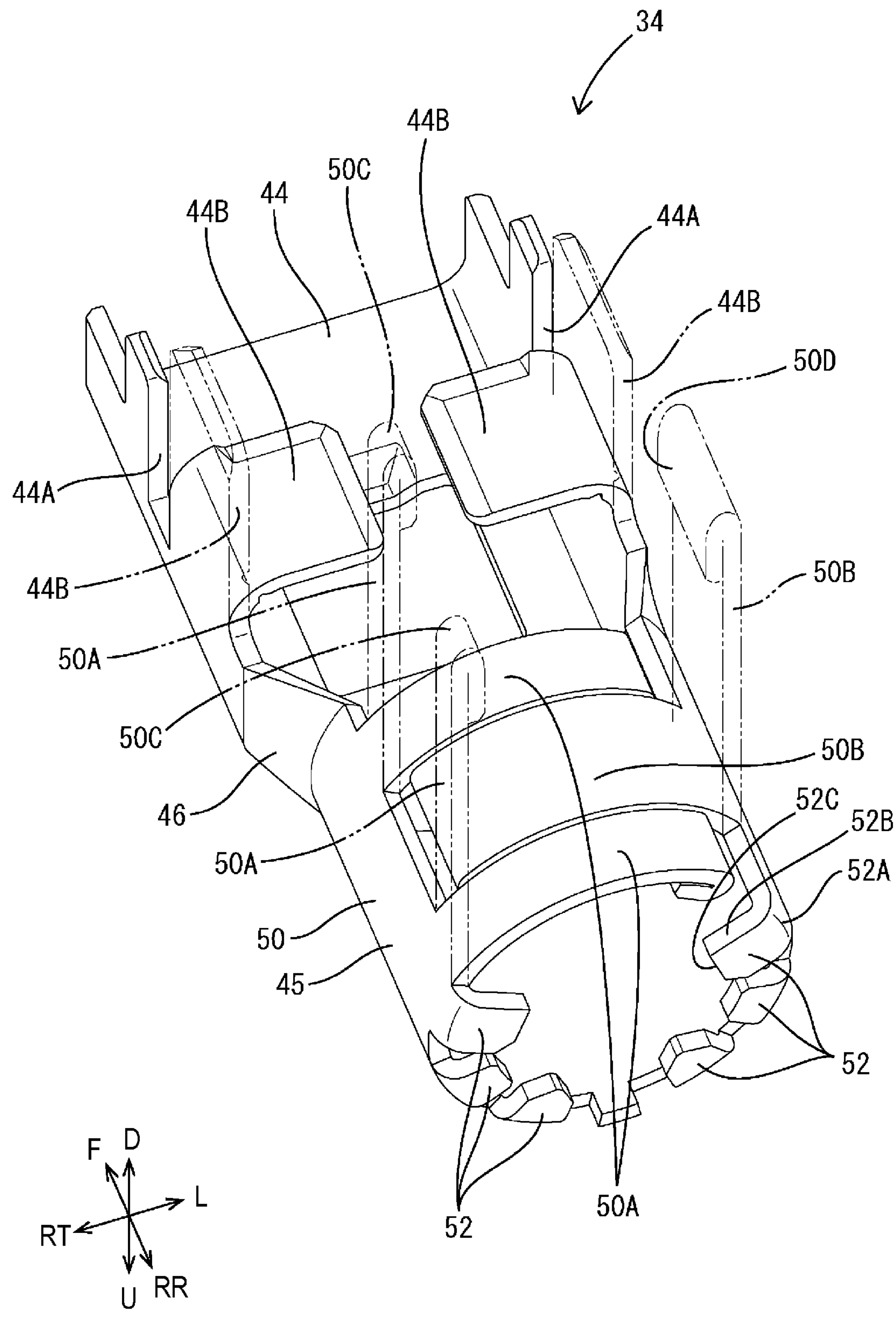
FIG. 4 is a perspective view of a second outer conductor.

In the front crimping portion 44, left and right walls hang down from both left and right end edges of an upper wall extending in the front-rear direction and lateral direction. As shown in FIG. 4, a slit 44A recessed upward is formed in a central part in the front-rear direction of each of the left and right walls. Lower end parts 44B of the respective left and right walls behind the slits 44 hang down as shown by a two-dot chain line before the second outer conductor 34 is assembled with the first outer conductor 33. The respective lower end parts 44B are bent toward a lateral center to embrace the first outer conductor 33 from below after the second outer conductor 34 is assembled with the first outer conductor 33 (see FIG. 10).

Figure 10:
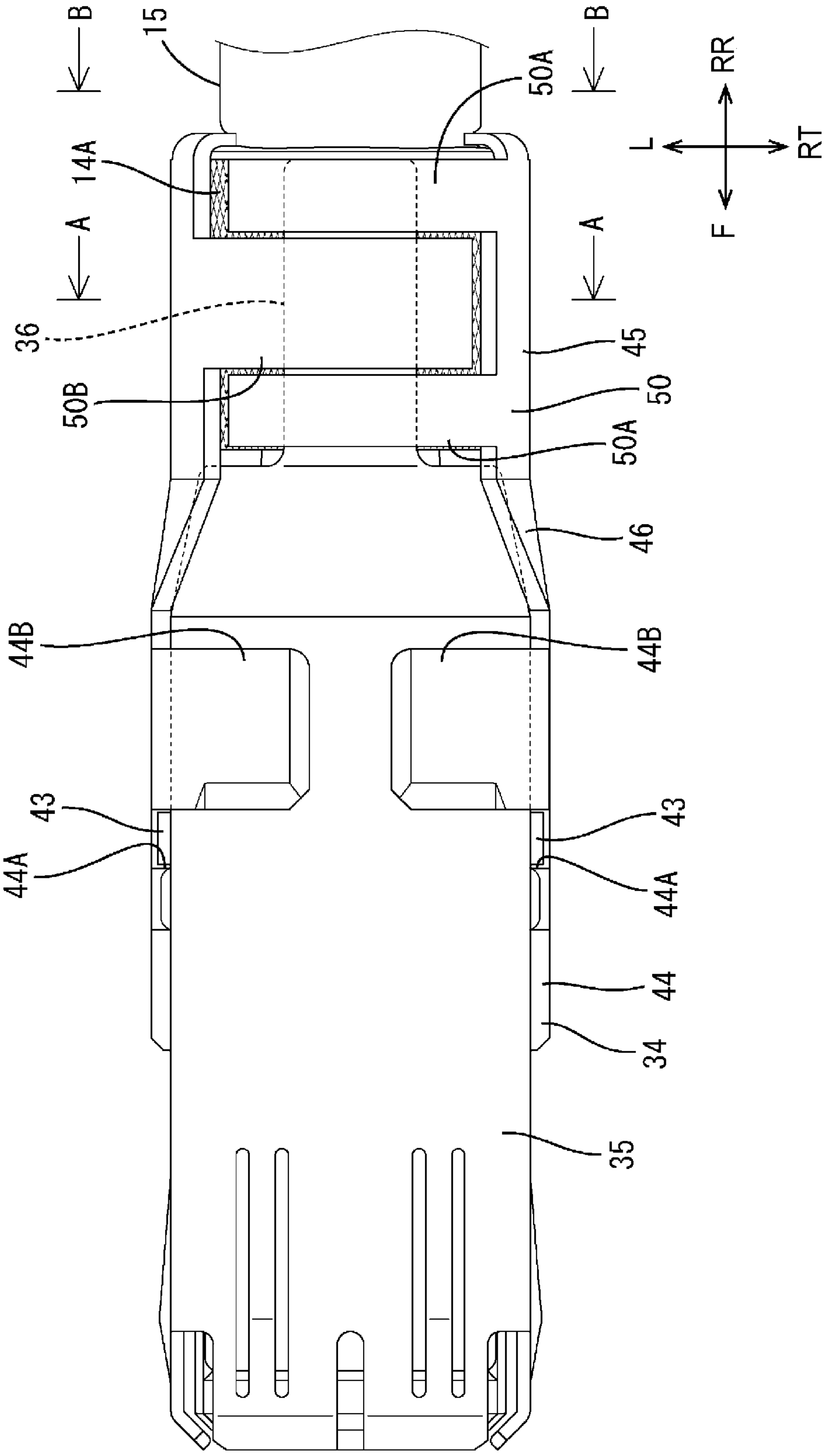
FIG. 10 is a side view showing a mounted state of the second outer conductor.

The projecting portion 43 provided on the left wall of the rectangular tube portion 35 is fit into the slit 44A in the left wall of the front crimping portion 44 (see FIG. 10). The projecting portion 43 provided on the right wall of the rectangular tube portion 35 is fit into the slit 44A in the right wall of the front crimping portion 44 (see FIG. 10). In this way, relative positions of the rectangular tube portion 35 and the front crimping portion 44 in the front-rear direction are determined. The second coupling portion 46 extends rearward from the rear end edge of the front crimping portion 44.

The rear crimping portion 45 is provided behind the second coupling portion 46 in a rear end part of the second outer conductor 34. The rear crimping portion 45 includes a swaging portion 50 extending rearward from the rear end part of the second coupling portion 46 and six claw portions 52 cantilevered radially inward from the rear end of the swaging portion 50.

The swaging portion 50 is curved upward when viewed from the front-rear direction. The swaging portion 50 includes two right crimping pieces 50A and a left crimping piece 50B. The two right crimping pieces 50A are provided at an interval in the front-rear direction on the right end edge of the swaging portion 50. One right crimping piece 50A is provided in each of front and rear end parts of the right end edge of the swaging portion 50. A right locking portion 50C is formed on a tip part of each right crimping piece 50C. The right locking portion 50C is formed by folding the tip part of the right crimping piece 50A laterally inward. These right crimping pieces 50A hang down as shown by a two-dot-chain line before being swaged to the shielded cable 11. These right crimping pieces 50A are curved and deformed along the outer peripheral surface of the shielded cable 11 to embrace the shielded cable 11 from below after being swaged to the shielded cable 11 (see FIG. 11).

The left crimping piece 50B is provided to extend in a central part in the front-rear direction of the left end edge of the swaging portion 50. A width in the front-rear direction of the left crimping piece 50B is set to be smaller than the interval in the front-rear direction between the pair of right crimping pieces 50A. A left locking portion 50D is formed on a tip part of the left crimping piece 50B. The left locking portion 50D is formed by folding the tip part of the left crimping piece 50B laterally inward. This left crimping piece 50B hangs down as shown by a two-dot-chain line before being swaged to the shielded cable 11. The left crimping piece 50B is curved and deformed along the outer peripheral surface of the shielded cable 11 to embrace the shielded cable 11 from below after being swaged to the shielded cable 11 (see FIG. 11). In this case, the left crimping piece 50B is arranged between the two right crimping pieces 50A. The swaging portion 50, the right crimping pieces 50A and the left crimping piece 50B change into an elliptical tubular shape having a minor axis in the vertical direction by being swaged to the end part of the shielded cable 11 (see FIGS. 11 and 12).

The six claw portions 52 are provided apart from each other along the rear end edge of the swaging portion 50. These claw portions 52 are bent radially inwardly of the shielded cable 11 substantially at a right angle from the rear end edge of the swaging portion 50 with the swaging portion 50 swaged to the end part of the shielded cable 11 (see FIG. 5). The rear end of the swaging portion 50 and a base end part 52B of the claw portion 52 are linked at a right angle via a bent portion 52A. A tip part 52C of the claw portion 52 is located more radially inwardly of the shielded cable 11 than the bent portion 52A and the base end part 52B. If the swaging portion 50, the right crimping pieces 50A and the left crimping piece 50B are swaged to the end part of the shielded cable 11, the tip parts 52C of these claw portions 52 bite into the outer periphery of the sheath 15 (see FIG. 5).

Figure 5:
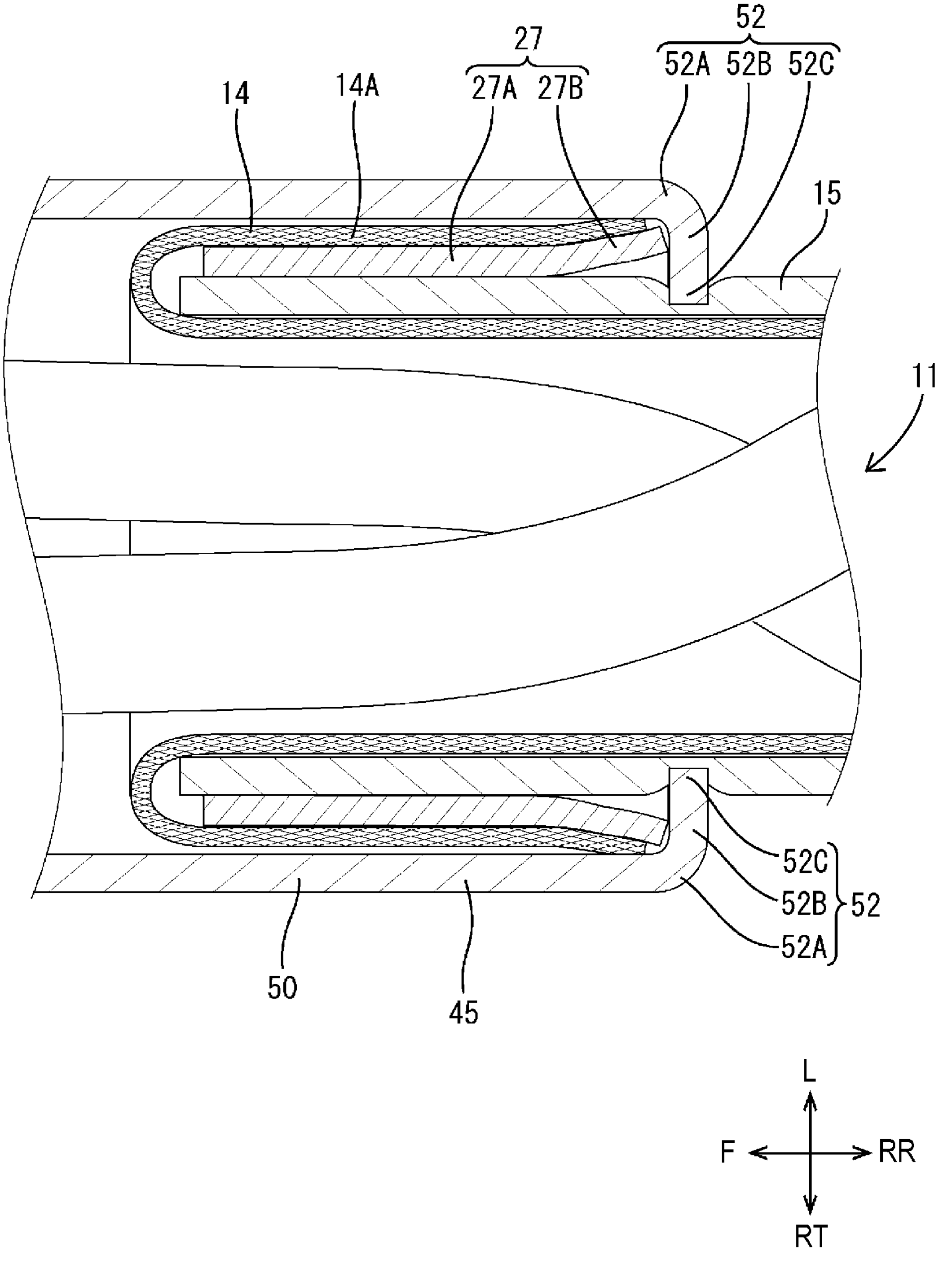
FIG. 5 is a partial side view in section showing a state where a rear crimping portion is swaged to an end part of a shielded cable.

With the rear crimping portion 45 swaged and crimped to the folded portion 14A and the connecting plate portion 36 (i.e. the end part of the shielded cable 11), the claw portions 52 are arranged to face and contact the rear end of the extending portion 27B of the sleeve 27 from behind (see FIG. 5).

Figure 11:
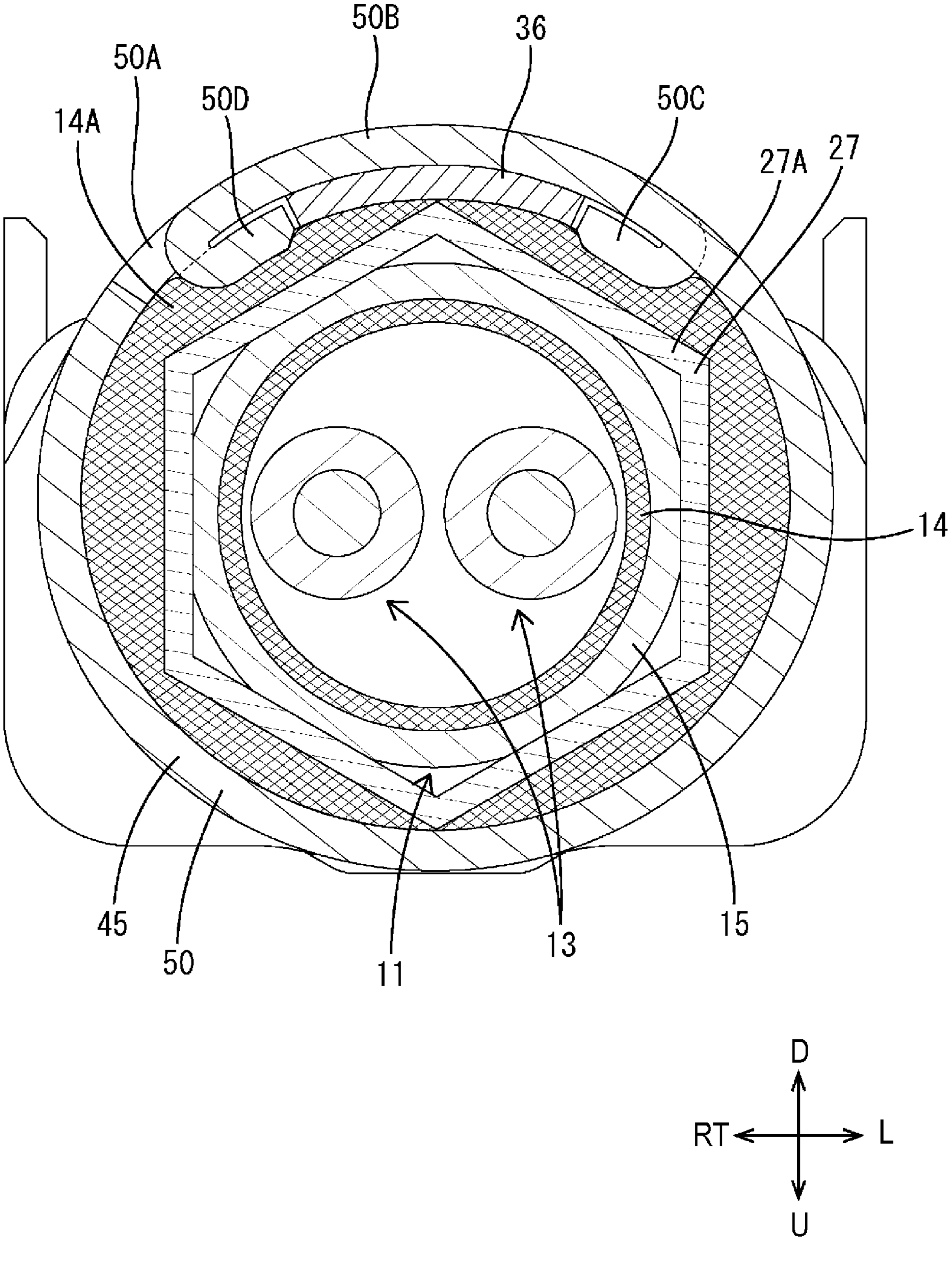
FIG. 11 is a section along A-A in FIG. 10.

Further, with the rear crimping portion 45 swaged to the folded portion 14A and the connecting plate portion 36 (i.e. the end part of the shielded cable 11), the right locking portions 50C are facing the left edge of the connecting plate portion 36 from left across a tiny gap (see FIG. 11). The left locking portion 50D is facing the right edge of the connecting plate portion 36 from right across a tiny gap (see FIG. 11). In this way, the rear crimping portion 45 is suppressed from being expanded and deformed in a radial direction of the shielded cable 11.

[Assembly of Shielded Electrically Conductive Path]

Next, an example of an assembly process of the shielded electrically conductive path 10 is described. The assembly process of the shielded electrically conductive path 10 is not limited to the one described below.

Figure 6:
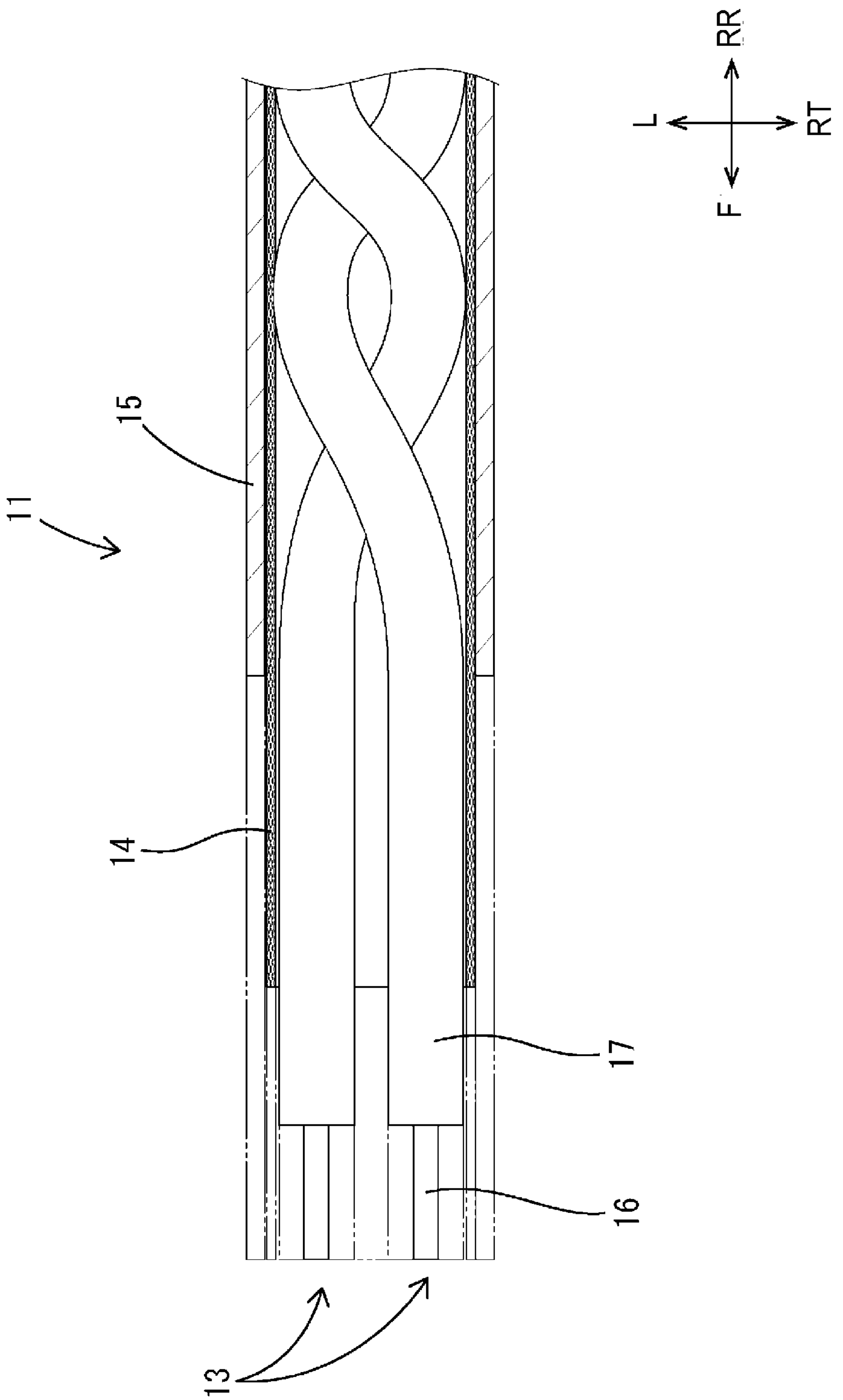
FIG. 6 is a side view in section showing a stripped end part of the shielded cable.

First, as shown in FIG. 6, the sheath 15 in a predetermined range is removed in an end part of the shielded cable 11. In this way, the braided wire 14 is exposed in the region where the sheath 15 is removed. In the exposed braided wire 14, a predetermined region of the braided wire 14 is cut to expose the coated wires 13. Then, the insulation coatings 17 in a predetermined range are removed in end parts of the coated wires 13. In this way, the core wires 16 are exposed in the regions where the insulation coatings 17 are removed.

Subsequently, as shown in FIG. 7, the wire barrel 22 of the female terminal 18 is crimped to the outer periphery of the core wire 16 and the insulation barrel 21 of the female terminal 18 is crimped to the outer periphery of the insulation coating 17. In this way, the female terminal 18 is connected to the end of the coated wire 13.

Subsequently, as shown in FIG. 8, the sleeve 27 is externally fit to the end part of the sheath 15. At this time, the sleeve 27 is externally fit to the end part of the sheath 15 with the extending portion 27B located behind the base portion 27A. Then, the base portion 27A of the sleeve 27 is swaged to the sheath 15. In this way, the outer shape of the base portion 27A changes from the hollow cylindrical shape to the hexagonal change (see FIGS. 2 and 3). Then, the braided wire 14 exposed from the end part of the sheath 15 is folded to form the folded portion 14A covering the outer peripheral surface of the sleeve 27. The front end of the base portion 27A of the sleeve 27 externally fit to the sheath 15 is located slightly behind the front end of the sheath 15. Then, the clip 25 is attached to the two coated wires 13.

Subsequently, the female terminals 18 are arranged in the upper dielectric 29, and the lower dielectric 28 is assembled with the upper dielectric 29. Then, the dielectric 19 is inserted into the rectangular tube portion 35 of the first outer conductor 33 from behind (see FIG. 9). At this time, the connecting plate portion 36 of the first outer conductor 33 is overlaid below the folded portion 14A (see FIG. 9).

Subsequently, as shown in FIG. 10, the second outer conductor 34 is mounted. At this time, the respective slits 44A of the second outer conductor 34 are fit to the respective projecting portions 43 of the rectangular tube portion 35. Then, the lower end parts 44B of the front crimping portion 44 are bent toward the lateral center and crimped to the outer periphery of the rectangular tube portion 35, and the rear crimping portion 45 (the swaging portion 50, the right crimping pieces 50A and the left crimping piece 50B) is crimped to the outer peripheries of the folded portion 14A (braided wire 14) and the connecting plate portion 36.

At this time, as shown in FIG. 11, the right and left crimping pieces 50A, 50B are crimped to wind around the outer peripheries of the folded portion 14A and the connecting plate portion 36. At this time, the left locking portion 50D of the left crimping piece 50B is locked to the right side edge of the connecting plate portion 36 from right, and the right locking portions 50C of the right crimping pieces 50A are locked to the left side edge of the connecting plate portion 36 from left. This suppresses the expansion and deformation of the rear crimping portion 45. In this way, the swaging portion 50, the right crimping pieces 50A and the left crimping piece 50B of the rear crimping portion 45 surround the folded portion 14A and are crimped to the sleeve 27. The rear crimping portion 45 is crimped to the folded portion 14A and the connecting plate portion 36, whereby the braided wire 14, the first outer conductor 33 and the second outer conductor 34 are electrically connected. At this time, the metal thin wires constituting the folded portion 14A are gathered toward a central part of each side away from corner parts of the hexagonal base portion 27A. In this way, the assembly of the shielded electrically conductive path 10 is finished.

Figure 12:
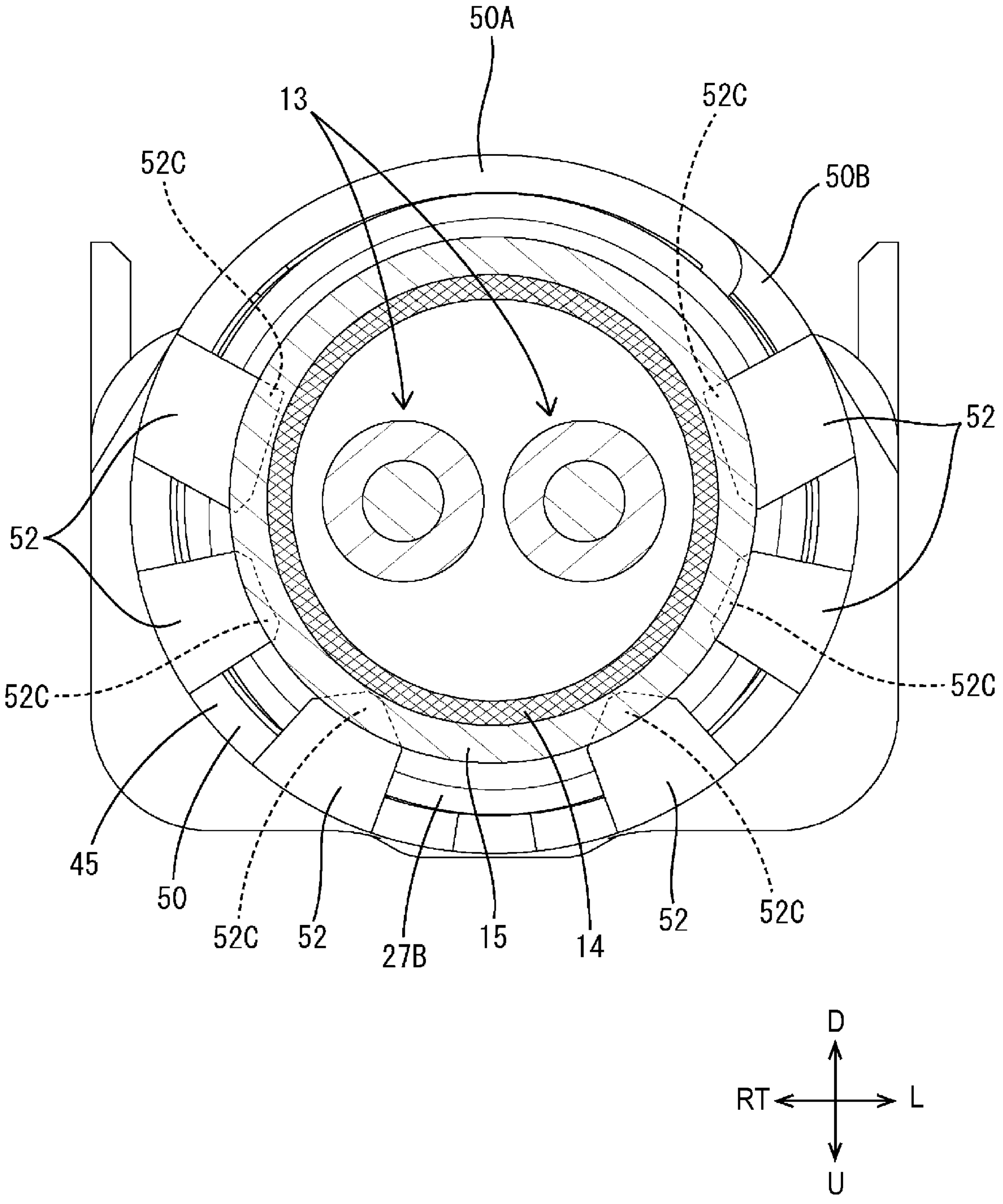
FIG. 12 is a section along B-B in FIG. 10.

At this time, as shown in FIG. 12, the rear end outer peripheral edge of the extending portion 27B of the sleeve 27 has a circular shape. The swaging portion 50, the right crimping pieces 50A and the left crimping piece 50B in the rear end part of the rear crimping portion 45 form an elliptical tubular shape having a minor axis in the vertical direction. Further, as shown in FIG. 5, the tip parts 52C of the claw portions 52 of the rear crimping portion 45 are biting into the outer periphery of the sheath 15. The base end parts 52B of the claw portions 52 are facing in contact with the rear end of the extending portion 27B of the sleeve 27 from behind. Further, the folded portion 14A (braided wire 14) is not interposed between the outer peripheral edge of a rear end part having a largest outer diameter of the extending portion 27B and the inner surface of the swaging portion 50. The outer peripheral edge of the extending portion 27B is in contact with the inner periphery of a laterally central part of an upper end part of the swaging portion 50 (see FIG. 12). In this way, even if the shielded cable 11 is pulled rearward, the claw portions 52 are suppressed from being expanded and deformed rearward.

Next, functions and effects of the embodiment are described.

The shielded electrically conductive path 10 of the present disclosure is provided with the shielded cable 11, the sleeve 27 and the second outer conductor 34. The shielded cable 11 includes the braided wire 14 surrounding the core wire 16 and the sheath 15 surrounding the braided wire 14, and the folded portion 14A covering the outer peripheral surface of the sheath 15 is formed by folding the front end part of the braided wire 14 rearward. The sleeve 27 is arranged in the gap between the outer peripheral surface of the sheath 15 and the folded portion 14A and swaged to the outer peripheral surface of the sheath 15. The second outer conductor 34 is formed with the rear crimping portion 45 in the rear end part. The rear crimping portion 45 includes the tubular swaging portion 50 and the claw portions 52 cantilevered radially inward from the rear end of the swaging portion 50. The sleeve 27 includes the tubular base portion 27A and the extending portion 27B extending rearward from the rear end edge of the base portion 27A. The outer diameter of the rear end of the extending portion 27B is larger than that of the base portion 27A. The rear crimping portion 45 is crimped to the sleeve 27 in a state where the swaging portion 50 surrounds the folded portion 14A and the claw portions 52 face the extending portion 27B from behind.

If the shielded cable 11 is pulled rearward, the extending portion 27B pushes the claw portions 52 rearward. When the extending portion 27B pushes the claw portion 52, a moment of a force originated from the bent portion 52A continuous with the claw portion 52 and the swaging portion 50 is smaller when the base end part 52B of the claw portion 52 is pushed than when the tip part 52C thereof is pushed. Since the extending portion 27B pushes the base end parts 52B of the claw portions 52 in the shielded electrically conductive path 10 of the present disclosure, there is no possibility that the claw portions 52 are deformed to open rearward. Therefore, according to the shielded electrically conductive path 10 of the present disclosure, the reliability of a fixing function against a tensile load can be improved.

The outer peripheral edge of the rear end of the extending portion 27B of the shielded electrically conductive path 10 of the present disclosure is in contact with the inner periphery of the swaging portion 50. According to this configuration, since positions where the extending portion 27B pushes the claw portions 52 can be set at positions closest to the inner peripheral surface of the swaging portion 50 (i.e. the base end parts 52B), the reliability of the fixing function against a tensile load can be most enhanced.

The rear end outer peripheral edge of the extending portion 27B of the shielded electrically conductive path 10 of the present disclosure has a circular shape, and the rear end part of the rear crimping portion 45 has an elliptical shape. According to this configuration, even if the swaging accuracy of the sleeve 27 and that of the rear crimping portion 45 are low, parts continuous with the minor axis, out of the swaging portion 50, can be brought into contact with the outer peripheral edge of the extending portion 27B.

OTHER EMBODIMENTS

The embodiment disclosed this time should be considered illustrative in all aspects, rather than restrictive. The scope of the present invention is not limited to the embodiment disclosed this time, but is represented by claims and intended to include all changes in the scope of claims and in the meaning and scope of equivalents.

Figure 13:
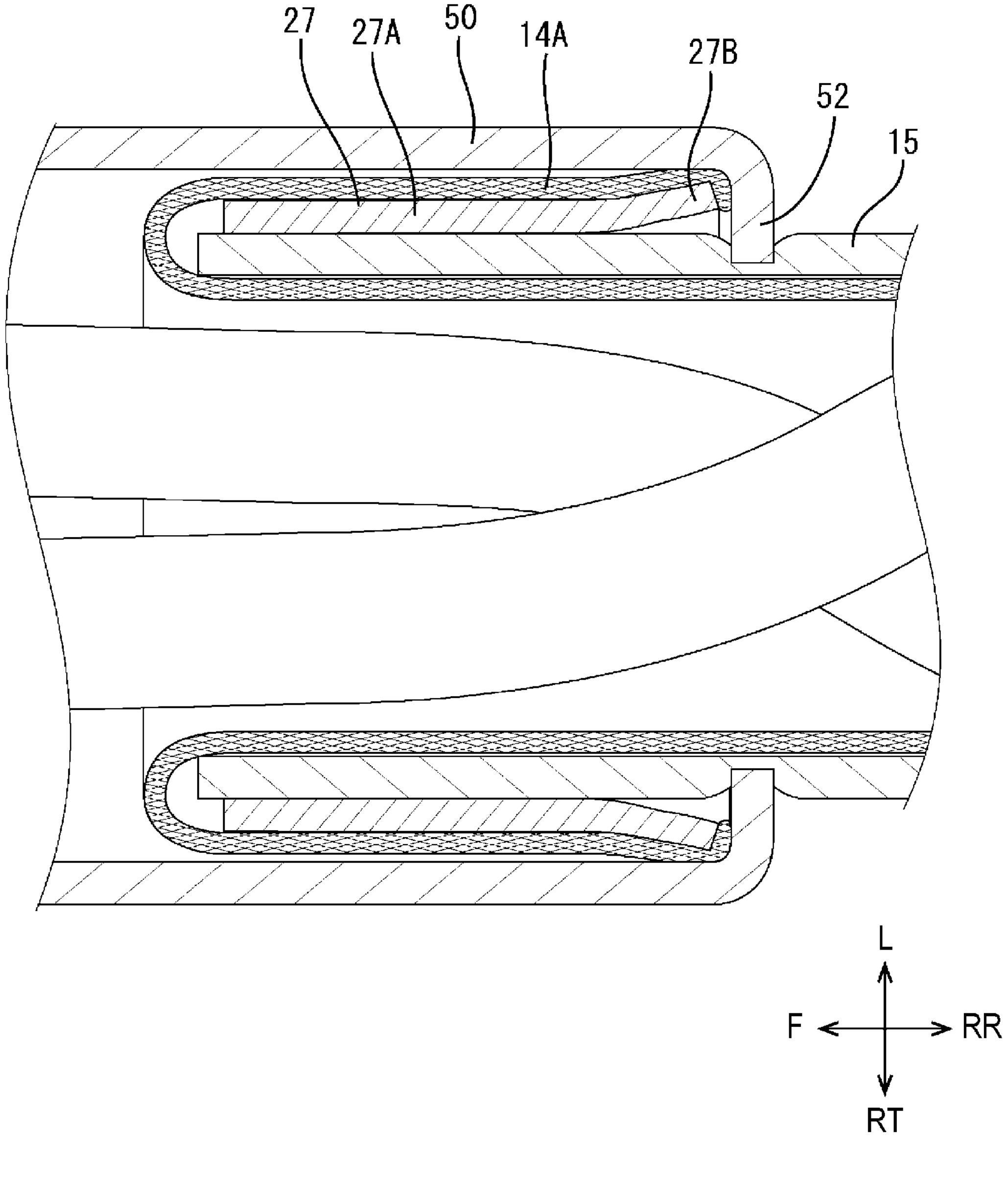
FIG. 13 is a partial side view in section showing another embodiment in a state where a rear crimping portion is swaged to an end part of a shielded cable.

Unlike the above embodiment, a part of the folded portion 14A may be sandwiched in a squeezed state between the outer peripheral surface of the extending portion 27B and the inner peripheral surface of the swaging portion 50 as shown in FIG. 13. According to this configuration, misalignment between the sleeve 27 and the folded portion 14A can be prevented.

Although the shield layer is the braided wire in the above embodiment, the shield layer may be a metal foil or the like without being limited to the braided wire.

Although the rear end outer peripheral edge of the extending portion has a circular shape and the rear end part of the rear crimping portion has an elliptical shape in the above embodiment, both the rear end outer peripheral edge of the extending portion and the rear end part of the rear crimping portion may have a circular shape.

Although a twisted pair cable is used as the shielded cable in the above embodiment, a coaxial cable may be used.

Figure 14:
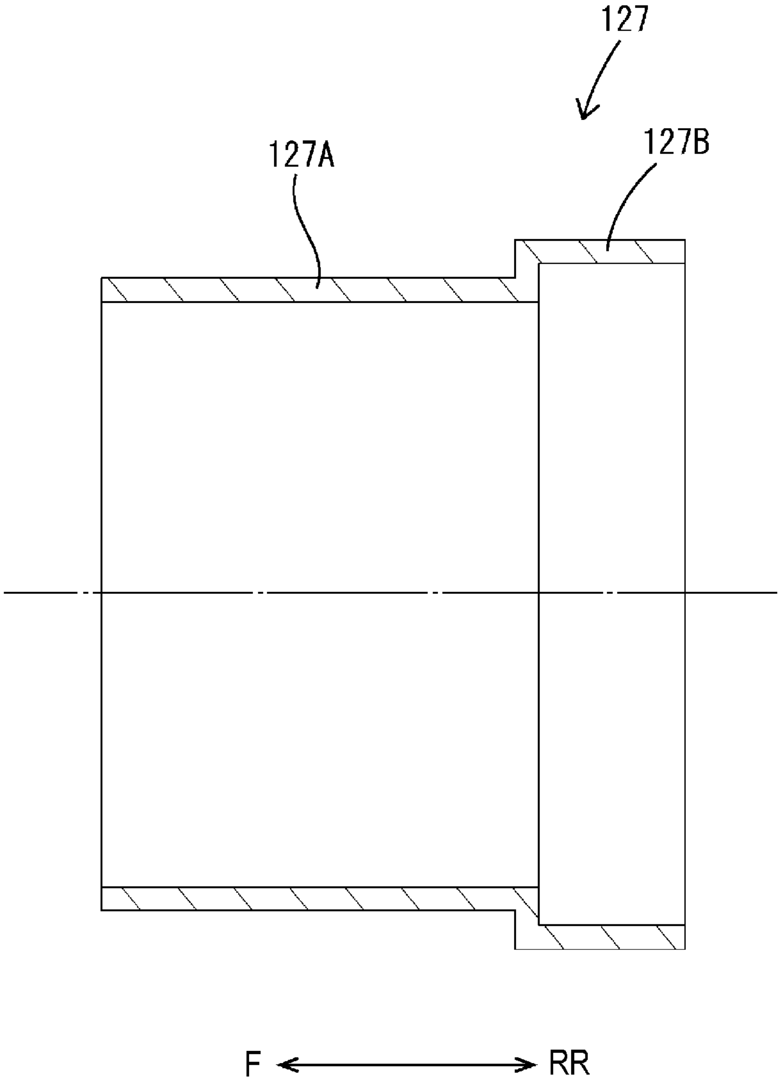
FIG. 14 is a side view in section showing another embodiment of a sleeve.

Unlike the above embodiment, a sleeve formed with a slit from one end to the other end in an axial direction may be used. Further, as in a sleeve 127 shown in FIG. 14, an outer diameter from the front end to the rear end of an extending portion 127B may be larger than that of a base portion 127A.

| | |
|---|---|
| 10 | shielded electrically conductive path |
| 11 | shielded cable |
| 13 | coated wire |
| 14 | braided wire (shield layer) |
| 14A | folded portion |
| 15 | sheath |
| 16 | core wire |
| 17 | insulation coating |
| 18 | female terminal |
| 19 | dielectric |
| 21 | insulation barrel |
| 22 | wire barrel |
| 23 | tube portion |
| 25 | clip |
| 27, 127 | sleeve |
| 27A, 127A | base portion |
| 27B, 127B | extending portion |
| 28 | lower dielectric |
| 29 | upper dielectric |
| 33 | first outer conductor |
| 34 | second outer conductor (outer conductor) |
| 35 | rectangular tube portion |
| 36 | connecting plate portion |
| 37 | first coupling portion |
| 43 | projecting portion |
| 44 | front crimping portion |
| 44A | slit |
| 44B | lower end part |
| 45 | rear crimping portion (crimping portion) |
| 46 | second coupling portion |
| 50 | swaging portion |
| 50A | right crimping piece |
| 50B | left crimping piece |
| 50C | right locking portion |
| 50D | left locking portion |
| 52 | claw portion |
| 52A | bent portion |
| 52B | base end part |
| 52C | tip part |

What is claimed is:

1. A shielded electrically conductive path, comprising:

a shielded cable including a shield layer surrounding a conductor, a sheath surrounding the shield layer and a folded portion covering an outer peripheral surface of the sheath, the folded portion being formed by folding a front end part of the shield layer rearward;

a sleeve arranged in a gap between the outer peripheral surface of the sheath and the folded portion, the sleeve being swaged to the outer peripheral surface of the sheath; and an outer conductor formed with a crimping portion in a rear end part, the crimping portion including a tubular swaging portion and a claw portion cantilevered radially inward from a rear end of the swaging portion, the sleeve including a base portion and an extending portion extending rearward from a rear end edge of the base portion, an outer diameter of a rear end of the extending portion being larger than that of the base portion, the crimping portion being crimped to the sleeve in a state where the swaging portion surrounds the folded portion and the claw portion faces the extending portion from behind, a part of the folded portion being sandwiched in a squeezed state between an outer peripheral surface of the extending portion and an inner peripheral surface of the swaging portion, and a rear end part of the folded portion being arranged between the rear end of the extending portion and the claw portion.

2. The shielded electrically conductive path of claim 1, wherein:

a rear end outer peripheral edge of the extending portion has a circular shape, and a rear end part of the crimping portion has an elliptical shape.

* * * * *